United States Patent [19]

Hutchison et al.

[11] Patent Number: 5,012,075

[45] Date of Patent: Apr. 30, 1991

[54] PORTABLE CONTAINER FOR VALUABLE ITEMS

[75] Inventors: Brian G. Hutchison, Dundee, Scotland; Ian Gahan, Perthshire, Great Britain

[73] Assignee: NCR Corporation, Dayton, Ohio

[21] Appl. No.: 456,514

[22] Filed: Dec. 26, 1989

[30] Foreign Application Priority Data

Sep. 15, 1989 [GB] United Kingdom ............... 89209407

[51] Int. Cl.[5] ......................... G06F 15/30; E05G 1/00

[52] U.S. Cl. ......................................... 235/379; 902/9; 902/13; 209/534; 109/43; 232/43.3

[58] Field of Search ....................... 235/379, 380, 381; 902/9-14; 209/534; 109/38, 39, 43, 44; 70/432, 433, 434; 232/43.1, 43.3, 43.5; 346/53, 20

[56] References Cited

U.S. PATENT DOCUMENTS

| | | | |
|---|---|---|---|
| 3,569,981 | 3/1971 | Hampton et al. | 70/434 X |
| 4,508,260 | 4/1985 | Keir et al. | 109/38 X |
| 4,529,118 | 7/1985 | Granzow et al. | 902/9 X |
| 4,529,119 | 7/1985 | Granzow et al. | 109/43 X |
| 4,648,327 | 3/1987 | Toth et al. | 902/4 X |
| 4,655,391 | 4/1987 | Granzow et al. | 109/43 X |
| 4,659,008 | 4/1987 | Howett et al. | 109/43 X |
| 4,670,643 | 6/1987 | Hain et al. | 235/379 |

FOREIGN PATENT DOCUMENTS 2135659 2/1983 United Kingdom .

*Primary Examiner*—Stuart S. Levy
*Assistant Examiner*—Steven M. DuBois
*Attorney, Agent, or Firm*—Wilbert Hawk, Jr.; Albert L. Sessler, Jr.; Elmer Wargo

[57] ABSTRACT

A currency cassette (10) has a printed circuit board (80) secured to one of its side walls, the board (80) having mounted thereon a microprocessor, a RAM, a real time clock chip, and battery means for supplying power for the board (80). First (208) and second switches are respectively operatively associated with the lid (14) of the cassette (10) and with a shutter which, when opened, permits currency notes to be extracted in operation from the cassette (10). Opening of the lid (14) or the shutter causes the appropriate switch to be actuated. Each switch is connected to the printed circuit board (80), and the microprocessor is arranged, in response to actuation of either of the switches, to store in the RAM data indicating which switch was actuated and the date and time of day when the relevant switch was actuated. The switches and printed circuit board (80) provide an effective tamper indicating system for the cassette (10).

10 Claims, 7 Drawing Sheets

PORTABLE CONTAINER FOR VALUABLE ITEMS

BACKGROUND OF THE INVENTION

This invention relates to portable containers for valuable items. Examples of such containers are currency note containers (hereinafter referred to as currency cassettes) of the kind used with cash dispensing machines and depository containers into which valuable items such as envelopes containing money may be deposited.

This invention has application to an automated teller machine (ATM) of the kind which is arranged to dispense currency notes, or accept a deposit of money, as may be required by a customer. As is well known, in operation of an ATM of this kind, a user inserts a customer identifying card into the machine and then enters certain data (such as a personal identification number, type of transaction, and quantity of money required or to be paid in) on one or more keyboards included in a user console of the machine. The machine will then process the transaction, dispense currency notes or accept a money deposit as may be requested, and return the card to the user as part of a routine operation. If currency notes are to be dispensed, these are picked from one or more currency cassettes included in the ATM and transported to a note exit slot in the user console. If money is to be deposited, the user typically inserts an envelope containing the money (cash and/or checks) through a deposit entry slot in the user console of an ATM, and the envelope is transported to, and deposited in, a depository container included in the ATM.

It may be desirable for a portable container for valuable items to incorporate tamper indicating means for indicating whether any unauthorized opening of the container has taken place. Thus, in the case of the currency cassette, it is important from a security point of view to be able to detect whether the cassette has been opened during the period between the cassette being loaded with currency notes and the cassette being inserted into an ATM. Also, in the case of a container represented by a depository container or by a currency cassette having some currency notes remaining therein, it is important from a security point of view to be able to detect whether the container has been opened during the period between the container being removed from an ATM and the container being officially opened at a bank or other secure establishment for removal of the contents of the container.

From U.K. Patent No. 2134973 there is known a portable depository container adapted to be inserted into an ATM, and including locking means arranged to permit the deposit of valuable articles in the container when in an unlocked condition, the locking means being arranged to be unlocked when the container is inserted in the ATM. The container includes mechanical tamper indicating means incorporating a resettable indicator means for indicating the number of times the locking means has been unlocked after the resetting of the indicator means.

From U.K. Patent Application No. 2135659A there is known a currency cassette including an electronic tamper indicating means, the cassette including an EPROM in which is stored data representing the individual characteristics, e.g. opacity, of all the notes contained in the cassette. The appropriate characteristics of notes dispensed from the cassette are read as the notes are dispensed, and are compared with the corresponding stored data. If the cassette has been tampered with and notes removed prior to the cassette being inserted in an ATM, then the characteristics read while notes are dispensed from the cassette will be "out of step" with the stored characteristics for the corresponding note positions, thereby indicating that tampering has taken place. This known cassette has the disadvantage that it is necessary to generate and store signals representing the characteristics of notes prior to loading the notes into the cassette.

SUMMARY OF THE INVENTION

It is an object of the invention to provide a portable container for valuable items which is of simple construction and which incorporates nonmechanical tamper indicating means overcoming the disadvantage of the known electronic tamper indicating means referred to above.

According to a preferred embodiment of this invention, there is provided a combination of a container for valuable items and a container receiving means for receiving said container, said container comprising:

door means for said container, said door means having opened and closed positions relative to said container receiving means so as enable the transfer of items to take place out of or into said container when said container is operatively positioned in said container receiving means and said door means is in said opened position;

data storing means for storing data;

switch means operatively associated with said door means to actuate said switch means when said door means is opened;

real time clock means for providing date and time of day data;

data processing means for processing data associated with said container; and battery means for supplying power to said data storage means, said data processing means, and said real time clock means during a period when said container is not inserted in said container receiving means;

said data processing means being effective in response to actuation of said switch means during said period to store in said data storing means data indicating the date and time of day when said door means was opened to cause said actuation.

The above advantages and others will be more readily understood in connection with the following description, claims and drawing.

DETAILED DESCRIPTION OF A PREFERRED EMBODIMENT

Figure 1:
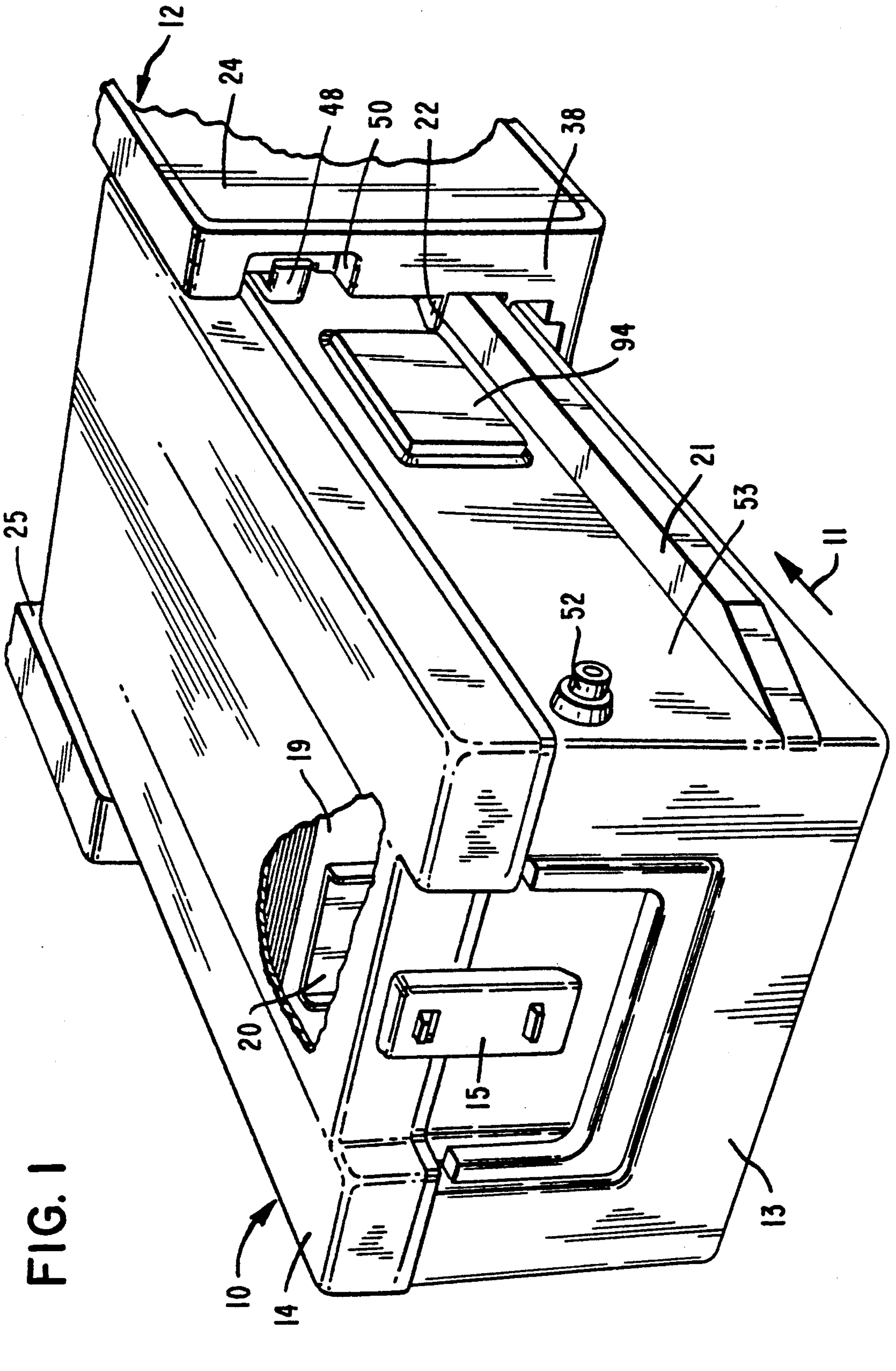
FIG. 1 is a perspective view of a currency cassette made in accordance with the present invention, the lid of the cassette being shown partly broken away and the cassette being shown partially inserted in a cassette receiving compartment of a cash dispenser mechanism.
Figure 2:
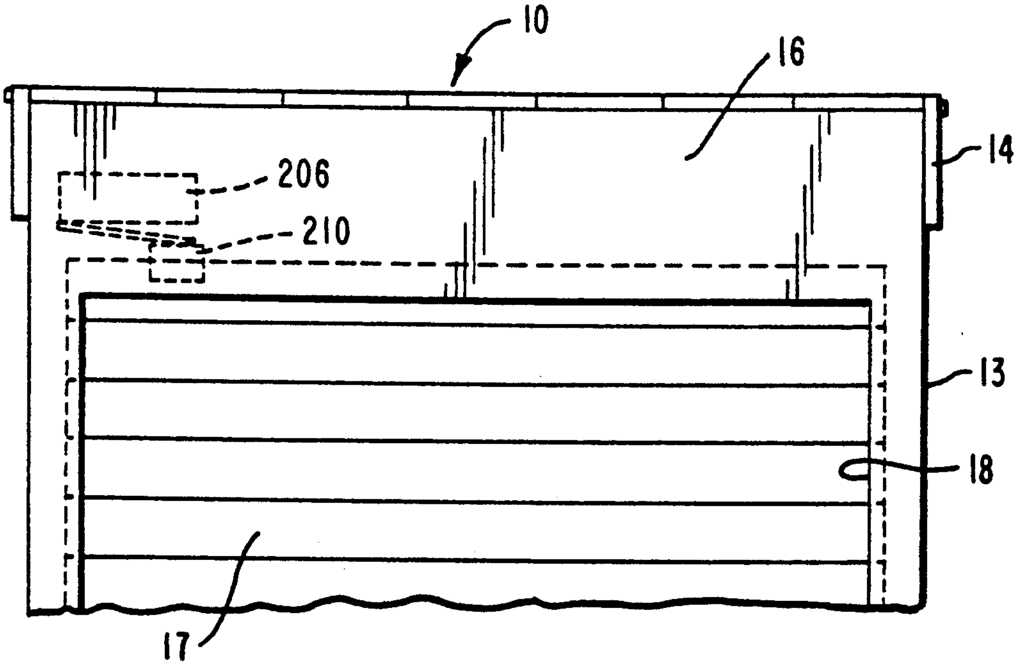
FIG. 2 is an end elevational view of an upper portion of the cassette, looking from the rear of the cassette as viewed from FIG. 1.

Referring to FIGS. 1 and 2 of the drawing, a cassette 10 for currency notes is adapted to be inserted (in the direction indicated by the arrow 11 in FIG. 1) into a receiving compartment 12 formed in a cash dispenser mechanism of an ATM (not otherwise shown). The cassette 10 comprises a note containing receptacle 13 and a lid 14 which is pivotally connected at one end (the rear end with reference to FIG. 1) to the receptacle 13 and which may be held in a closed, locked position by locking means 15. Both the receptacle 13 and the lid 14 are made of plastic.

The end wall 16 (FIG. 2) of the receptacle 13 opposite the locking means 15 is provided in conventional manner with a door in the form of a slatted shutter 17 which is arranged to be held locked in a closed position prior to the cassette 10 being inserted into the compartment 12, the shutter 17 in its closed position serving to close an opening 18 in the wall 16. When the cassette 10 is inserted into the compartment 12, the shutter 17 is automatically unlocked and moved to an open position in known manner; when the cassette 10 is removed from the compartment 12, the shutter 17 is returned by spring means (not shown) to its closed position and becomes automatically locked in its closed position by latch means (not shown), again in known manner. With the cassette 10 correctly located in a fully inserted position in the compartment 12, notes are extracted in operation from the receptacle 13 via the opening 18 by means of a conventional pick mechanism 224 (FIG. 7), included in the dispenser mechanism, for feeding and presentation to a customer, a stack of notes 19 (FIG. 1) contained in the receptacle 13 being urged towards the opening 18 by means of a pusher member 20.

The outer surfaces of the side walls of the cassette 10 are respectively provided with two horizontally extending rails 21. The rails 21 are respectively adapted to slidably engage two horizontally extending guide members 22 of generally U-shaped cross-section which are respectively provided on the inner surface of two vertical side walls 24, 25 of the compartment 12. During the insertion of the cassette 10 into the compartment 12, the leading ends (right-hand ends with reference to FIG. 1) of the rails 21 are directed into the guide members 22, and thereafter the cassette 10 is guided into the compartment 12 by virtue of the rails 21 sliding along the guide members 22 until the cassette 10 reaches its fully inserted position. Insertion of the cassette 10 into the compartment 12 is facilitated by virtue of a flared configuration of an end portion 26 of each guide member 22 (see FIG. 3).

Figure 3:
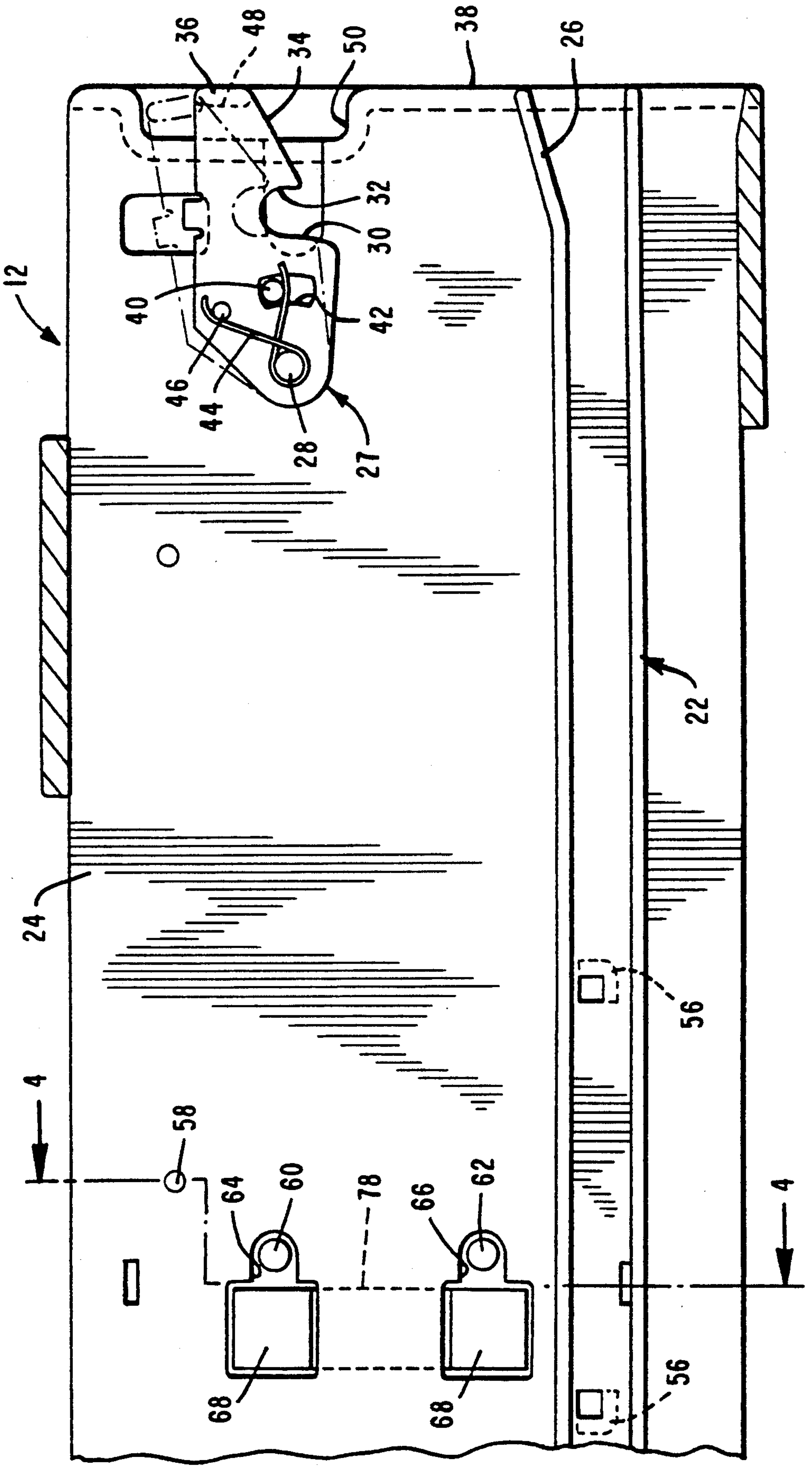
FIG. 3 is a side elevational view of part of one of the inner side walls of the cassette receiving compartment of FIG. 1.

As shown in FIG. 3, the inner surface of the side wall 24 of the compartment 12 has mounted thereon a latch and stop member 27, the member 27 being pivotally mounted on a stud 28 secured to the side wall 24. The lower edge of the member 27 incorporates a vertically extending stop surface 30, a semicircular recess 32, and a cam portion 34 extending between the recess 32 and an end portion 36 positioned adjacent the front end 38 (with reference to FIG. 1) of the side wall 24. Pivotal movement of the member 27 relative to the side wall 24 is limited by virtue of a stud 40 secured to the wall 24 engaging an arcuate slot 42 formed in the member 27. The member 27 is normally resiliently held in the rest position shown in FIG. 3, in which the stud 40 is in engagement with the upper end of the slot 42, by means of a torsion spring 44 mounted on the stud 28, the ends of the spring 44 respectively engaging the stud 40 and an additional stud 46 secured to the member 27. The member 27 can be manually pivoted in a counterclockwise direction (with reference to FIG. 3) away from this rest position by means of a lug 48 (see also FIG. 1) secured to the end portion 36 and disposed in a recess 50 formed in the end 38 of the side wall 24.

When the cassette 10 is inserted into the compartment 12 in the direction of the arrow 11 in FIG. 1, a latch stud 52 provided on the outer surface of a side wall 53 of the cassette 10 engages the cam surface 34 of the latch stop member 27 shortly before the cassette 10 reaches its fully inserted position. Continued movement of the cassette 10 in the direction of the arrow 11 brings about a pivotal movement of the member 27 away from its rest position until the latch stud 52 on the cassette 10 engages the stop surface 30, at which point the torsion spring 44 brings about a return movement of the member 27 towards its rest position so as to bring the recess 32 into engagement with the latch stud 52. The cassette 10 is now securely and accurately latched in its correct operational position in the receiving compartment 12. It should be understood that the member 27 can be readily disengaged from the latch stud 52 by manual operation of the lug 48 in an upwards direction, whereupon the cassette 10 may be slid out of the compartment 12.

Figure 4:
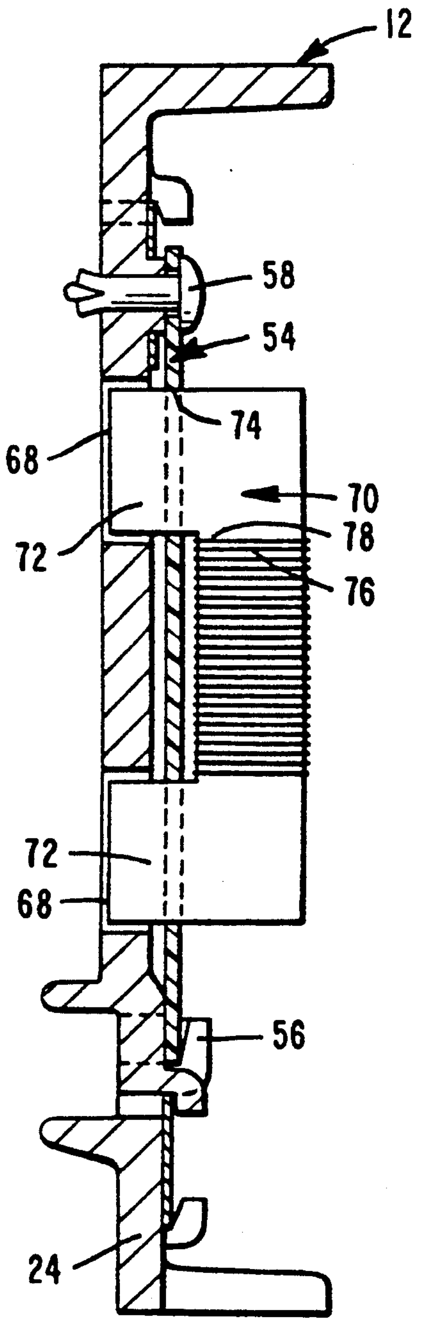
FIG. 4 is a sectional elevational view taken along the line 4—4 of FIG. 3.
Figure 7:
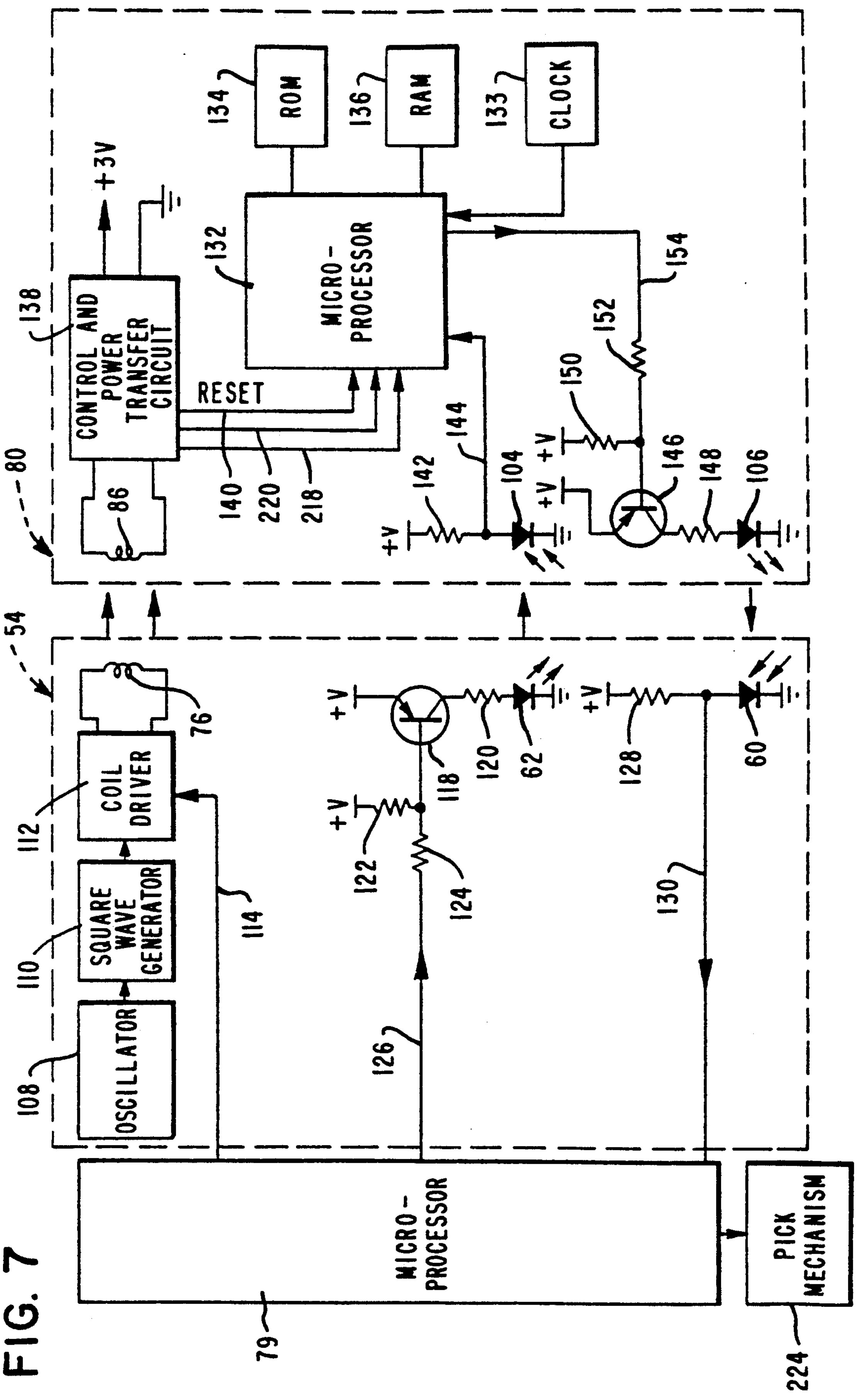
FIG. 7 is a circuit diagram of a data and power transfer system of which the cassette forms a part and of a tamper indicating system included in the cassette.

Referring now also to FIG. 4, a printed circuit board 54 is mounted on the outer surface of the side wall 24. The printed circuit board 54 is held in position by virtue of the lower edge of the board 54 fitting beneath a pair of lips 56 formed integrally with the wall 24, and by virtue of an upper portion of the board 54 being secured to the wall 24 by means of a fastening member 58. A photodiode 60 and a light emitting diode (LED) 62 (FIG. 3) are mounted on the inner surface of the board 54, the photodiode 60 and the LED 62 being respectively positioned in two apertures 64 and 66 formed in the wall 24 so that, when the cassette 10 is inserted in the compartment 12, the photodiode 60 and the LED 62 face the cassette 10. The ends 68 of a U-shaped magnetic core 70 are also respectively positioned in the apertures 64 and 66. The side portions 72 of the core 70 pass through correspondingly-dimensioned apertures 74 formed in the board 54, and a coil 76 comprising 300 turns is wound around the central portion 78 of the core 70, the coil 76 being positioned on that side of the board 54 opposite the side on which the photodiode 60 and LED 62 are mounted and the ends of the coil 76 being electrically connected to the board 54. Other electrical components, which are not shown in FIGS. 3 and 4 but which will be described with reference to FIG. 7, are mounted on the outwardly facing surface of the board 54. An electrical cable (not shown) is connected to the board 54 for applying power to the board 54 and for enabling data transfer to take place between the board 54 and a microprocessor 79 (FIG. 7) which serves to control the operation of the cash dispenser mechanism.

Figure 6:
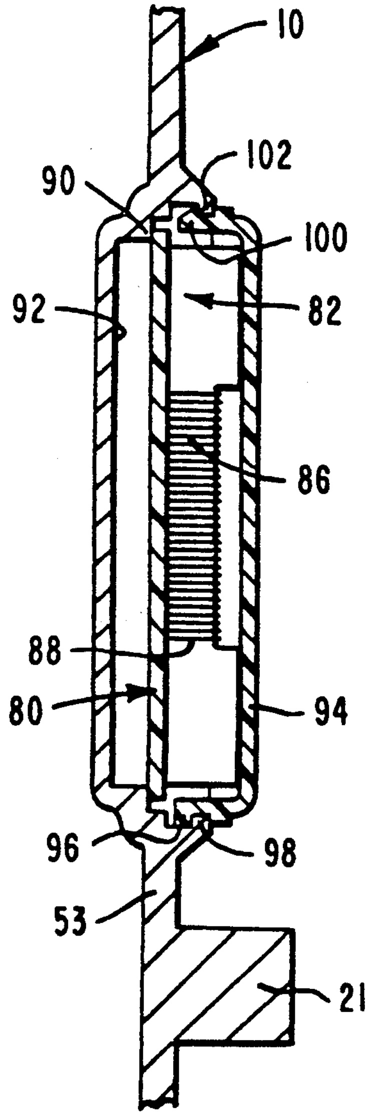
FIG. 6 is a sectional elevational view taken along the line 6—6 of FIG. 5, with FIG. 6 being shown on the sheet containing FIG. 4.
Figure 5:
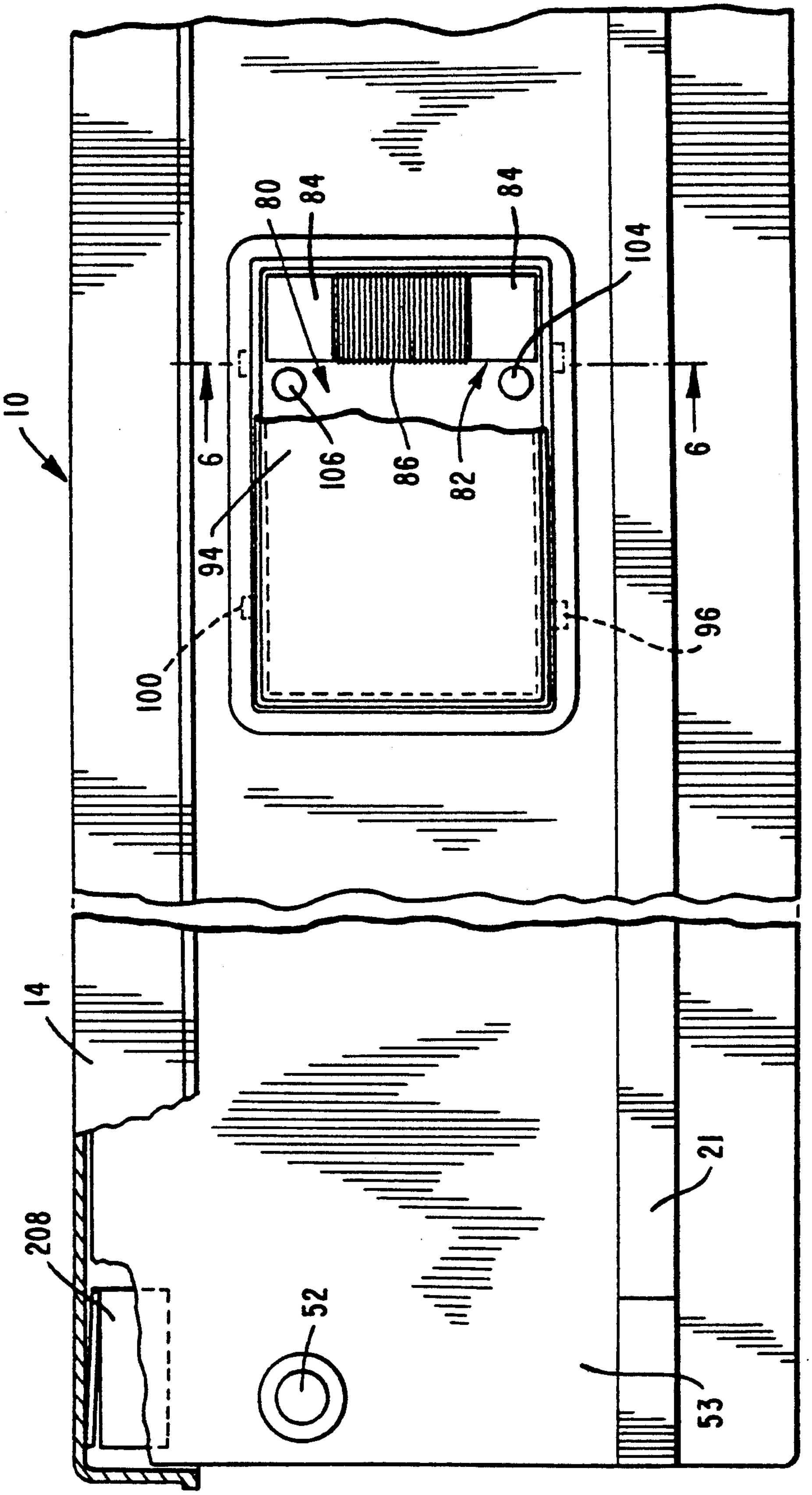
FIG. 5 is an elevational view of part of the right-hand side of the cassette shown in FIG. 1, with parts of the right-hand wall and right-hand side of the lid being shown broken away.

Referring now particularly to FIGS. 5 and 6, a printed circuit board 80 is mounted on the outer surface of the side wall 53 of the cassette 10. A flattened U-shaped magnetic core 82 is mounted on the outwardly facing surface of the board 80 with the ends 84 of the core 82 facing outwards. A coil 86 comprising 200 turns is wound around the central portion 88 of the core 82, the ends of the coil 86 being electrically connected to the printed circuit board 80. As shown in FIG. 6, the periphery of the board 80 engages a shoulder 90 formed around the periphery of a recess 92 in the outer surface of the side wall 53 of the cassette 10. The board 80 is held in position on the side wall 53 by means of a cover 94 (shown partly broken away in FIG. 5) which engages the ends 84 of the core 82 and which is secured to the wall 53, the cover 94 being made of a plastic material which is transmissive to infra red light. The cover 94 is secured to the wall 53 by means of two lugs 96 on the lower edge of the cover 94 which engage a first lip 98 formed integrally with the wall 53, and by means of two latch members 100 on the upper edge of the cover 94 which are adapted to snap into engagement with a second lip 102 formed integrally with the wall 53.

Figure 8:
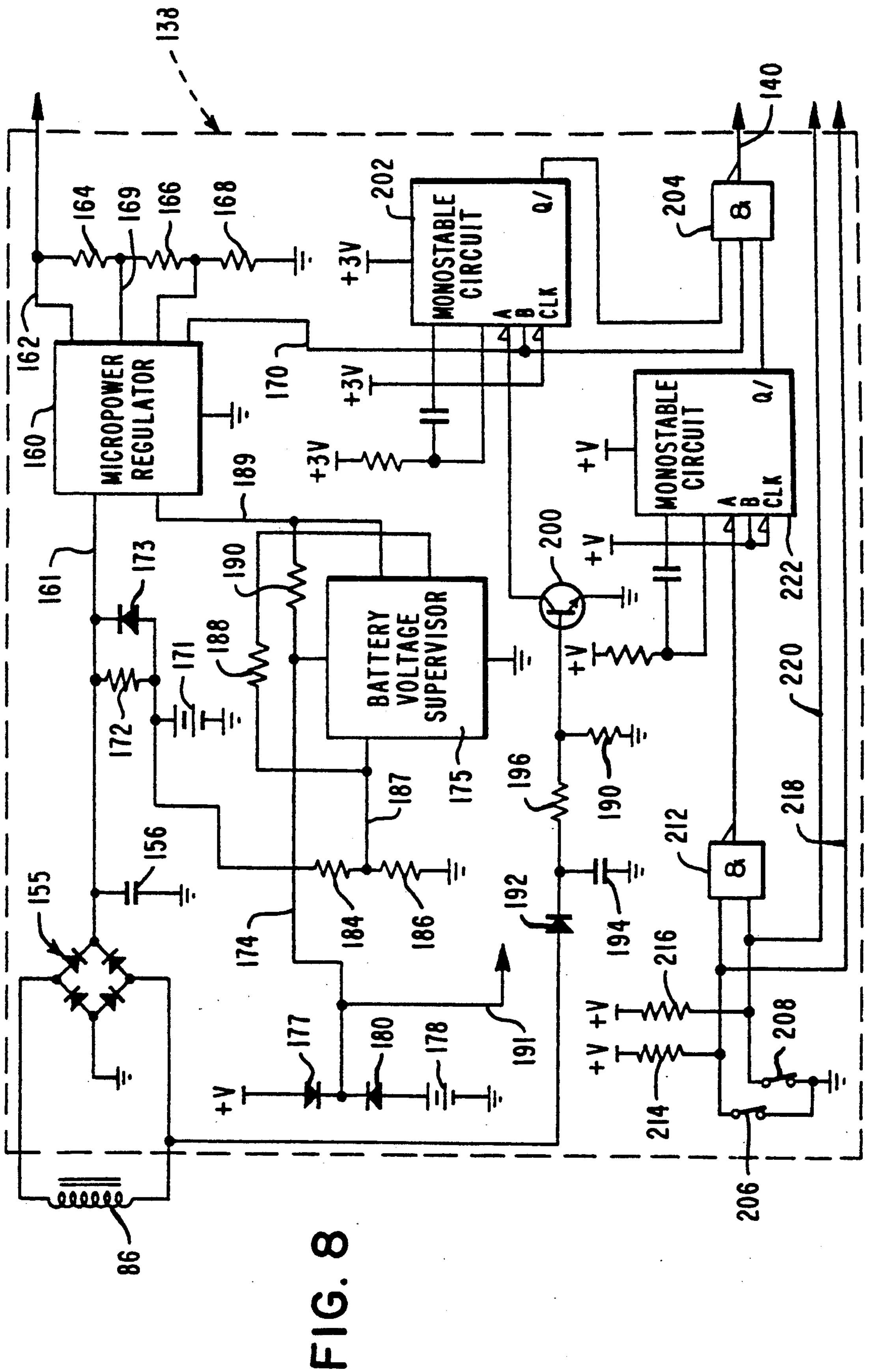
FIG. 8 is a circuit diagram of a control and power transfer circuit shown in block form in FIG. 7, this circuit including part of the tamper indicating system.

A photodiode 104 and an LED 106 (FIG. 5) are mounted on the outwardly facing surface of the printed circuit board 80 in positions such that, when the cassette 10 is in its correct operational position in the compartment 12, the photodiode 104 is in cooperative relationship with the LED 62 mounted on the printed circuit board 54, and the LED 106 is in cooperative relationship with the photodiode 60 mounted on the board 54. Also, when the cassette 10 is in its correct operational position in the compartment 12, the coil 86 is in cooperative relationship with the coil 76 mounted on the board 54, the ends 85 of the core 82 being in register with, and spaced approximately 10 millimeters from, the ends 68 of the core 70. Other electrical components, which are not shown in FIGS. 5 and 6 but which will be described with reference to FIG. 8, are mounted on the board 80, some of these components being accommodated in the recess 92. It should be understood that the LEDs 62 and 106 transmit infra red light, and the photodiodes 60 and 104 are responsive to infra red light.

Referring to FIG. 7, the printed circuit board 54 includes an oscillator 108 which has a frequency of between 1500 and 2000 Hz and which is arranged to operate continuously during operation of the cash dispenser mechanism. The oscillator 108 is connected to the coil 76 via a square wave generator 110 and a coil driver 112 which drives the coil 76 with a 24 v square wave. The coil driver 112 is arranged to be rendered operative for the purpose of driving the coil 76 in response to a signal ENABLE applied to the coil driver 112 over a line 114 from the microprocessor 79 which serves to control the operation of the cash dispenser mechanism. The LED 62 of the printed circuit board 54 is connected as shown in FIG. 7 in a circuit including a transistor 118 and resistors 120, 122 and 124. Binary data signals, where a high level signal =1 and a low level signal =0, are applied to the base of the transistor 118 from the microprocessor 79 via a line 126, a high level signal turning the transistor 118 off and thereby rendering the LED 62 inoperative, and a low level signal turning the transistor 118 on and thereby rendering the LED 62 operative. The photodiode 60 is connected as shown in FIG. 7 in a circuit including a resistor 128, the junction between the photodiode 60 and the resistor 128 being connected to the microprocessor 79 via a line 130. Binary data signals, where again a high level signal =1 and a low level signal =0, are applied to the microprocessor 79 over the line 130. Data transfer between the microprocessor 79 and the printed circuit board 54 is at a rate of 300 or 600 bauds, with 8 bits per word.

The printed circuit board 80 includes a microprocessor 132, a real time clock chip 133, a read only memory (ROM) 134 in which are stored the programs for the microprocessor 132, and a random access memory (RAM) 136 which is connected to the microprocessor 132 and in which is stored information relating to the currency cassette 10 and the contents thereof. Such information includes an identification number for the cassette 10, and the quantity and denomination of the currency notes contained in the cassette 10. If desired, the RAM 136 may also store information as to when and where the cassette 10 was last replenished and information concerning the functional history of the cassette 10. When the cassette 10 is in its correct operational position in the receiving compartment 12, power for the microprocessor 132, clock chip 133, ROM 134, and RAM 136 is provided by a control and power transfer circuit 138 which is connected to the coil 86. It should be understood that the coils 76 and 86 together serve as a transformer whereby power may be transferred in operation from the printed circuit board 54 to the printed circuit board 80. As will be explained in more detail later in relation to FIG. 8, the circuit 138 also serves to apply a pulse RESET to the microprocessor 132 over a line 140 for the purpose of rendering the microprocessor 132 operational, and to apply control signals to the microprocessor 132 over lines 218 and 220 which form part of a tamper indicating system.

The photodiode 104 of the printed circuit board 80 is connected as shown in FIG. 7 in a circuit including a resistor 142, the junction between the photodiode 104 and the resistor 142 being connected to the microprocessor 132 over a line 144. Also, the LED 106 is connected as shown in FIG. 7 in a circuit including a transistor 146 and resistors 148, 150 and 152, the base of the transistor 146 being connected to the microprocessor 132 via a line 154. In a similar manner to the transfer of data between the microprocessor 79 and the photodiode 60 and LED 62, data signals are applied by the photodiode 104 to the microprocessor 132 via the line 144, and data signals are applied by the microprocessor 132 to the LED 106 via the line 154, data transfer within the printed circuit board 80 also being at a rate of 300 or 600 bauds. In operation, data transfer from the printed circuit board 80 to the printed circuit board 54 takes place by virtue of infra red light from the LED 106, when activated, falling upon the photodiode 60, and data transfer from the board 54 to the board 80 takes place by virtue of infra red light from the LED 62, when activated, falling upon the photodiode 104.

Referring now to FIG. 8, the control and power transfer circuit 138 includes a rectifier circuit 155 which is connected across the coil 86. In operation, an AC voltage of about 7 volts peak to peak is developed across the coil 86 in response to the alternating current flowing in the coil 76. This AC voltage is smoothed by a capacitor 156 and applied to an input terminal of a micropower regulator 160 over a line 161. The micropower regulator 160 provides a regulated +3 v output voltage supply in an output line 162, this output voltage being set by resistors 164, 166 and 168 which are connected between the line 162 and ground and to the regulator 160 as shown in FIG. 8. The voltage on the line 162 serves in operation as the power supply for the microprocessor 132, clock chip 133, ROM 134, RAM 136, photodiode 104, transistor 146 and LED 106, and other components included in the circuit 138. The micropower regulator 160 also serves as a comparator to indicate when the regulated output voltage on the line 162 falls below a predetermined specification. The input to the comparator is applied to a terminal of the regulator 160 over a line 169, and a low level signal ERROR appears on an output line 170 in the event of the regulated output voltage falling below said predetermined specification.

A rechargeable nickel-cadmium battery 171 is connectable to the line 161 via a resistor 172 and via diode 173 which is reverse biased during normal operation of the cassette 10 while the cassette 10 is inserted in the compartment 12, the normal operational voltage on the line 161 at such time being greater than the voltage of the battery 171. In the event of the cassette 10 being removed from the receiving compartment 12, the diode 173 becomes forward biased so that the battery 171 provides the voltage supply on the line 162 via the micropower regulator 160, this supply being utilized, as required, by the microprocessor 132 and associated components. When the cassette 10 is reinserted in the compartment 12, or is inserted in a similar cassette receiving compartment of a different ATM, the resistor 172 provides a charging path for the battery 171 from the line 161 so that the battery 171 returns to a fully charged condition.

The control and power transfer circuit 138 also includes a battery voltage supervisor 175. Normally, power to the voltage supervisor 175 is provided over a line 174 from the regulated output voltage supply line 162 via a forward biased diode 177. A lithium battery 178 is connectable to the line 174 via a diode 180 which is reverse biased during normal operation of the cassette 10. Two resistors 184 and 186 are connected in series between the positive terminal of the battery 171 and ground, the junction between the resistors 184 and 186 being connected to an input terminal of the voltage supervisor 175 over a line 187. The line 187 is also connected via a resistor 188 to a first output terminal of the voltage supervisor 175, and a second output terminal of the supervisor 175 is connected to a terminal of the micropower regulator 160 over a line 189, the line 189 being connected via a resistor 190 to the line 174. The voltage supervisor 175 monitors the voltage supplied by the battery 171, and in the event of this voltage falling below a predetermined level while the cassette 10 is not inserted in the compartment 12, the supervisor 175 will shut down the micropower regulator 160 by applying an appropriate signal to the regulator 160 over the line 189. The shutting down of the micropower regulator 160 will cause an ERROR signal to appear on the line 170, thereby rendering the microprocessor 132 non-operational as will be made clear later. At the same time, the diode 180 becomes forward biased so that a back-up power supply is provided by the lithium battery 178 to the clock chip 133 and the RAM 136 over a line 191 so as to maintain the clock chip 133 operational and to prevent data stored in the RAM 136 from being lost; at this time the diode 177 is reverse biased so as to prevent current from the battery 178 being applied to other components of the cassette 10.

A circuit comprising a diode 192, capacitor 194, resistors 196 and 198, and a transistor 200 is connected as shown in FIG. 8 between a terminal of the coil 86 and an input terminal A of a monostable circuit 202. The line 170 is connected to another input terminal B of the monostable circuit 202 and to a first input terminal of a NAND gate 204, an output terminal Q/ (read as Q Bar) of the monostable circuit 202 being connected to a second input terminal of the gate 204. Other connections are made to the monostable circuit 202 as shown in FIG. 8. When the inductive power supply comprising the coils 76 and 86 is active, the circuit 192, 194, 196, 198, 200 provides a signal to the input terminal A of the monostable circuit 202 which enables the circuit 202. With the monostable circuit 202 enabled, upon the regulated voltage supply on the line 162 coming within the required specification, the monostable circuit 202 is triggered in response to the signal ERROR on the line 170 becoming inactive. Upon the monostable circuit 202 being triggered, a low level pulse is generated at the output terminal Q/, this pulse causing a high level pulse RESET to be applied from the output of the gate 204 over the line 140 (see also FIG. 7) to the microprocessor 132 so as to cause the microprocessor 132 to commerce operation by initiating operation of its internal clock, the microprocessor 132 using an appropriate one of the programs stored in the ROM 134. After the cessation of the pulse RESET with the microprocessor 132 operational, the signal on the line 140 will be low. In the event of a low level signal ERROR again appearing on the line 170 as a result of the regulated voltage on the line 162 going out of specification, the signal on the line 140 will go permanently high, thereby causing the microprocessor 132 to be rendered inoperative.

Referring now to FIGS. 2 and 5, the cassette 10 is provided with two microswitches 206 (FIG. 2) and 208 (FIG. 5) which are connected by leads (not shown) to the printed circuit board 80. The switch 206 is secured to the inner surface of the wall 16 and is arranged to be engageable by a projection 210 secured to the inner surface of the uppermost portion of the shutter 17. When the shutter 17 is in its closed position, the projection 210 is in engagement with the switch 206 so as to hold the switch 206 in a closed condition. When the shutter 17 is moved to its open position, the projection 210 moves out of engagement with the switch 206, thereby permitting the switch 206 to change to an open condition.

The switch 208 is secured to the inner surface of the uppermost portion of the wall 53 of the cassette 10, the switch 208 being positioned adjacent the front end (with reference to FIG. 1) of the cassette 10. When the lid 14 is in its closed position, the lid 14 is in engagement with the switch 208 so as to hold the switch 208 in a closed condition. When the lid 14 is opened, it moves out of engagement with the switch 208, thereby permitting the microswitch 208 to change to an open condition.

Referring again to FIG. 8 the switch 206 is connected between ground and a first input terminal of a gate 212, and the switch 208 is connected between ground and a second input terminal of the gate 212. The input terminals of the gate 212 are respectively connected via resistors 214 and 216 to the voltage supply as supplied on line 162 and are also respectively connected to the output lines 218 and 220 (see also FIG. 7). The output terminal of the gate 212 is connected to an input terminal A of a monostable circuit 222, an output terminal Q/ of which is connected to a third input terminal of the gate 204. Other connections are made to the monostable circuit 222 as shown in FIG. 8. Upon either of the switches 206 and 208 being opened, a low level pulse is generated at the output terminal Q/ of the monostable circuit 222 so as to cause a high level pulse RESET to be applied to the microprocessor 132 over the line 140 and thereby cause the microprocessor 132 to commence operation. At the same time, a high level signal is applied to the microprocessor 132 (FIG. 7) over the line 218 or the line 220, depending on whether the switch 206 or the switch 208, respectively, has been opened. If a high level signal is applied to the microprocessor 132 over the line 218, then using an appropriate program stored in the ROM 134 the microprocessor 132 causes to be stored in the RAM 136 data indicative that the switch 206 has been actuated (i.e. that the shutter 17 has been opened), together with data (supplied by the clock chip 133) representing the date and time of day that the switch 206 was actuated. Similarly, if a high level signal is applied to the microprocessor 132 over the line 220, then again using an appropriate program stored in the ROM 134, the microprocessor 132 causes to be stored in the RAM 136 data indicative that the switch 208 has been actuated (i.e. that the lid 14 has been opened), together with data presenting the date and time of day that the switch 208 was actuated. The program used by the microprocessor 132 to carry out such data storage will cause the microprocessor 132 to return to a non-operational condition after the data storage operation has been completed.

The operation of the cassette 10 and the associated parts of the cash dispenser mechanism of the ATM in which the cassette 10 is used will now be described. Initially, the cassette 10 is loaded with currency notes in a secure area of a bank or other financial institution, and information as to the contents of the cassette 10 is written into the RAM 136. Following completion of the loading operation, the lid 14 is locked in its closed position, and a check is made that the shutter 17 is also locked in its closed position. The loaded cassette 10 is then transported from the secure area to the ATM, for example by means of a security firm. Normally, there will be no reason for the lid 14 or shutter 17 to be unlocked and opened during the transportation of the cassette 10 from the secure area to the ATM. If, however, an opening of the lid 14 or the shutter 17 does take place during this time, thereby causing the switch 206 or the switch 208 to be actuated, then data indicative of which of the switches 206 and 208 has been actuated, together with data representing the date and time of such actuation, will be stored in the RAM 136 in the manner previously described. It should be understood that the nickel-cadmium battery 171 provides the power for enabling the microprocessor 132 to store this data in the RAM 136.

After delivery of the cassette 10 to the ATM, the cassette 10 is inserted into the receiving compartment 12 in the manner previously described, the latch stud 52 engaging the recess 32 in the latch and stop member 27 so as to latch the cassette 10 in its correct operational position, with the coil 86 positioned in cooperative relationship with respect to the coil 76, and with the photodiode 104 and LED 106 respectively positioned in cooperative relationship with the LED 62 and the photodiode 60. During the insertion of the cassette 10 into the compartment 12, the shutter 17 is automatically unlocked and moved to its open position, thereby causing the switch 206 to be actuated, and data representing the date and time of this actuation is stored by the microprocessor 132 in the RAM 136 with the battery 171 supplying the necessary power. Activation of the cassette 10 is initiated by the microprocessor 79 (FIG. 7) applying a signal ENABLE over the line 114 to the coil driver 112 so as to activate the coil 76 and thereby cause power to commence to be transferred from the board 54 to the board 80 via the transformer formed by the coils 76 and 86. Upon the regulated voltage on the line 162 reaching the required specification, a signal RESET will be applied to the microprocessor 132 over the line 140 thereby rendering the microprocessor 132 operational. The cassette 10 is now in a condition ready for currency notes to be picked therefrom and for data to be transferred between the RAM 136 and the microprocessor 79. Initially, the microprocessor 132 reads from the RAM 136 information as to the contents of the cassette 10 and as to the identification number of the cassette 10, and then transmits data representing this information via the line 154 to the circuit including the LED 106. This data is then transmitted by the LED 106 to the photodiode 60, and from the photodiode 60 the data is transmitted over the line 130 to the microprocessor 79. Pick operations are then initiated in the course of each of which one or more currency notes is or are extracted from the cassette 10 through the opening 18 (FIG. 2) by the conventional pick mechanism 224 (FIG. 7), each pick operation being initiated by the microprocessor 79 sending an appropriate signal to the pick mechanism 224. After each pick operation has been completed, the microprocessor 79 transmits to the LED 62 over the line 126 data representing the number of notes picked in the operation. This data is then transmitted by the LED 62 to the photodiode 104, from where the data is transmitted over the line 144 to the microprocessor 132 which causes to be written in the RAM 136 data representing the number of notes remaining in the cassette 10.

When the number of notes remaining in the cassette 10 reaches a predetermined low level, a signal to this effect is sent by the microprocessor 132 to the microprocessor 79, and in known manner the microprocessor 79 provides an indication that the cassette 10 should be replaced by a full cassette. As previously mentioned, when the cassette 10 is removed from the compartment 12, the shutter 17 is automatically returned to, and locked in, its closed position. The cassette 10 is then transported back to the previously mentioned secure area where the lid 14 is unlocked and opened and the notes remaining in the cassette 10 are removed. As in the case of any actuation of the switch 206 or the switch 208 during the transportation of the cassette 10 from the secure area to the ATM, any actuation of the switch 206 or the switch 208 brought about by an opening of the lid 14 or the shutter 17 during the transportation of the cassette 10 back to the secure area causes data representing details of such actuation to be stored in the RAM 136. Following the removal of the remaining notes from the cassette 10, the relevant part of the data stored in the RAM 136 is read out so as to ascertain whether any opening of the lid 14 had taken place in the period while the cassette 10 was away from the secure area, and whether any opening of the shutter 17 had taken place in this period other than the opening of the shutter 17 when the cassette 10 was inserted into the compartment 12. The reading out of the relevant data from the RAM 136 could be effected by means of a data transfer system operating in a similar manner to the data transfer system hereinbefore described for transferring data from the RAM 136 to the microprocessor 79. If it is found that one or more openings of the lid 14, or two or more openings of the shutter 17, had taken place during said period, then an explanation will be required. It should be understood that, in an alternative mode of operation to that described above, storage of data representing the opening of the shutter 17 when the cassette 10 is inserted into the compartment 12 may be dispensed with.

From a security point of view, it is advantageous to know the date and time when an opening of the shutter 17 or of the lid 14 has taken place while the cassette 10 is away from the secure area, rather than merely knowing the number of times, if any, that the shutter 17 or the lid 14 has been opened during this period. For example, if an unauthorized opening of the cassette 10 has taken place, it can be important to know if the opening took place during transportation of the cassette 10 to an ATM or during transportation of the cassette 10 away from the ATM. Also, it can be important to know if the cassette 10 has been opened more than once during a short space of time, for example while the cassette 10 is being inserted into, or removed from, an ATM.

Thus, it will be appreciated that the microswitches 206 and 208 and the printed circuit board 54 and the components associated therewith constitute an effective tamper indicating system for the cassette 10, this tamper indicating system having the advantage that it is simple to operate and is highly reliable in operation. Also, the cassette 10 has the advantage that it is of simple construction. Moreover, since power is transferred to the cassette 10 via the coils 76 and 86 when the cassette 10 is in its correct operational position in the compartment 12, the nickel-cadmium battery 171 is automatically recharged when the cassette 10 is in this position, thereby ensuring that the cassette 10 can be used many times without the battery 171 requiring attention. Further, the lithium battery 178 can have a very long life since it is only required to provide power to the clock chip 133 and the RAM 136 when the voltage supplied by the battery 171 falls to a predetermined level.

It should be understood that the tamper indicating system described above in relation to the accompanying drawing could also be incorporated in a depository container for valuable items, such as customer identifying cards or envelopes containing money, such container being adapted to be inserted into an ATM, for example in the manner described in U.K. Patent No. 2134973 referred to hereinbefore.

What is claimed is:

1. The combination of a container for valuable items and a container receiving means for receiving said container, said container comprising:

door means for said container, said door means having opened and closed positions relative to said container receiving means so as to enable the transfer of items to take place out of or into said container when said container is operatively positioned in said container receiving means and said door means is in said opened position;

data storing means for storing data;

switch means operatively associated with said door means to actuate said switch means when said door means is opened;

real time clock means for providing date and time of day data;

data processing means for processing data associated with said container; and battery means for supplying power to said data storage means, said data processing means, and said real time clock means during a period when said container is not inserted in said container receiving means;

said data processing means being effective in response to actuation of said switch means during said period to store in said data storing means data indicating the date and time of day when said door means was opened to cause said actuation.

2. The combination as claimed in claim 1 in which said container has an access means moveable between opened and closed positions to enable said items to be manually inserted into or manually removed from said container when said access means is in said opened position, and in which said container includes a second switch means operatively associated with said access means to actuate said second switch means when said access means is moved to said opened position;

said data processing means being effective in response to actuation of either said switch means or said second switch means to store in said data storing means data indicating which of the switch means and second switch means has been actuated along with data indicating the date and time of day which the associated switch means or second switch means has been actuated.

3. The combination as claimed in claim 2 in which said container also includes a pulse generating means to produce an output pulse in response to an actuation of either said switch means or said second switch means, said output pulse being effective to render said data processing means operational for the purpose of storing data in said data storing means; and in which said container also includes means responsive to an actuation of said switch means and said second switch means for applying a signal to said data processing means while said data processing means is operational to provide an indication as to which of said switch means and said second switch means has been actuated.

4. The combination as claimed in claim 1 in which said battery means includes a rechargeable battery and in which said container includes voltage supervisor means for monitoring the voltage supplied by said rechargeable battery;

said voltage supervisor means being effective to render said data processing means non-operational in the event of the voltage supplied by the rechargeable battery falling below a predetermined level.

5. The combination as claimed in claim 4 in which said container includes a first circuit means including a first coil for receiving power;

said container receiving means including a second circuit means including a second coil mounted thereon to provide power to said first circuit means;

said first and second coils acting as a transformer when said container is mounted in said container receiving means, and said first circuit means providing a DC voltage supply which is utilized to recharge said rechargeable battery as necessary while said container is mounted in said container receiving means.

6. The combination as claimed in claim 5 further including:

first light operated data transmitting means mounted on said container receiving means;

first light operated data receiving means mounted on said container and being coupled to said data processing means to receive data from said first light operated data transmitting means and to write said data into said data storing means;

second light operated data transmitting means mounted on said container and adapted to receive data from said data storing means via said data processing means;

second light operated data receiving means mounted on said container receiving means and coupled to said second light operated data transmitting means to receive data therefrom; and said DC voltage supply being effective to provide power to said data processing means, said data storing means, said clock means, said first light operated data receiving means, and said second light operated data transmitting means while said container is inserted in said container receiving means.

7. The combination as claimed in claim 6 in which said data storing means is a random access memory.

8. The combination as claimed in claim 7 in which said battery means also includes a second battery which provides power to said real time clock means and said random access memory in the event that the voltage supplied by said rechargeable battery falls below said predetermined level.

9. The combination as claimed in claim 8 further including means for disabling said nonrechargeable battery from supplying power when the voltage supplied by said rechargeable battery is at least at said predetermined level.

10. The combination as claimed in claim 9 in which said container is a currency cassette and in which said door means is in the form of a shutter which permits currency notes to be extracted from said currency cassette by pick means associated with said container receiving means.

* * * * *